(12) United States Patent
Gocha et al.

(10) Patent No.: US 8,771,776 B2
(45) Date of Patent: Jul. 8, 2014

(54) METHOD TO PRODUCE, TRANSPORT, AND UTILIZE FLOUR AND FLOUR BLENDS

(76) Inventors: Todd W Gocha, Wappingers Falls, NY (US); Joseph Dileonardo, Elmhurst, IL (US)

( * ) Notice: Subject to any disclaimer, the term of this patent is extended or adjusted under 35 U.S.C. 154(b) by 62 days.

(21) Appl. No.: 13/373,027

(22) Filed: Nov. 2, 2011

(65) Prior Publication Data

US 2012/0135118 A1 May 31, 2012

Related U.S. Application Data

(60) Provisional application No. 61/456,227, filed on Nov. 3, 2010.

(51) Int. Cl.
*A23L 1/317* (2006.01)

(52) U.S. Cl.
USPC ........... 426/518; 426/392; 426/622; 426/463; 426/559; 426/410; 426/449; 426/450; 426/520; 426/625; 426/627; 426/414

(58) Field of Classification Search
USPC ......... 426/392, 518, 622, 463, 449, 450, 410, 426/520, 625, 627, 414; 99/323.4, 323.11, 99/323.5, 323.6, 323.7, 323.8, 323.9; 241/6, 7, 8, 9, 10, 11, 12, 13
See application file for complete search history.

(56) References Cited

U.S. PATENT DOCUMENTS

| | | | | |
|---|---|---|---|---|
| 3,556,802 | A | * | 1/1971 | Schellhaas ..................... 426/560 |
| 4,018,030 | A | * | 4/1977 | Christensson .................. 53/527 |
| 5,750,166 | A | * | 5/1998 | Schellhaass .................... 426/93 |

OTHER PUBLICATIONS

Vacuum packaging NPL, http://www.fantes.com/vacuum-packaging.html, 2008.*
Flint Corn NPL, https://www.usaemergencysupply.com/information_center/all_about_grains/all_about_grains, 2008.*
Particle Size NPL, http://www.engineeringtoolbox.com/particle-sizes-d_934.html, 2006.*

* cited by examiner

*Primary Examiner* — Drew Becker
*Assistant Examiner* — Preston Smith
(74) *Attorney, Agent, or Firm* — Tod R. Nissle, P.C.

(57) ABSTRACT

A method to produce a food product comprises the steps of providing a plurality of flint corn kernels; drying the flint corn kernels; popping the flint corn kernels; cooling the porous, airy, elastic foam particles produced during popping; cutting with a moving blade said porous, airy foam particles into pieces having a width greater than 0.005 inches to produce an elastic, air entrained popcorn flour occupying a volume; and, vacuum packaging the elastic popcorn flour to reduce the volume occupied by the popcorn flour.

20 Claims, No Drawings

METHOD TO PRODUCE, TRANSPORT, AND UTILIZE FLOUR AND FLOUR BLENDS

This application claims priority based on U.S. Provisional Patent Application Ser. No. 61/456,227 filed Nov. 3, 2011.

This invention relates to methods and apparatus for producing a new flour-like ingredient and food products which incorporate the flour-like ingredient.

Those of skill in the art have for many years pursued systems to reduce the cost of producing flour and food products which utilize flour, as well as systems to increase the nutritional value and reduce the caloric value of flour and associated food products.

Accordingly, it would be highly desirable to provide an improved system to manufacture a flour-like ingredient and incorporate the flour-like ingredient into food products.

In accordance with the invention, we have discovered a new process for producing a new food product. The process comprises producing a novel elastic puffed "cut" "hot" flour by heating flint corn to "pop" the individual kernels, and cutting (shearing) the popped kernels to produce a lightweight, elastic, air entrained particles. The popped kernels can be sheared while warm, but preferably are allowed to cool, and solidify, to ambient temperature or to an elevated temperature which is within about thirty degrees F. of ambient. Openings in the particles contain air, and the shape and dimension of adjacent particles produces air spaces between the particles. The cut hot flour can include particles of any desired size, but in the preferred embodiment of the invention the elastic particles are sufficiently large to include air filled chambers or openings in the particle. The greatest width of each particle can vary as desired but presently preferably is in the range of 0.001 inch to 0.500 inch, preferably 0.0025 inch to 0.400 inch, more preferably 0.005 inch to 0.300 inch, and most preferably 0.006 to 0.250 inch. Milled wheat flour typically has a particle size in the range of about 0.00004 inch to 0.004 inch.

In an alternate embodiment of the invention, the popped kernels are micromilled.

The cut hot flour is entrained with air and is less dense than conventional wheat flour. The cut hot flour, for example, can weigh about 3.125 gm per one quarter cup while conventional wheat flour often will weigh about 31 gm per one quarter cup; and, the density of air-popped white popcorn weighing 8.45 grams per metric cup is typically about 0.034 grams per cubic centimeter. Consequently, the density of cut hot flour produced in accordance with the invention is at least 10% less, preferably at least 20% less, more preferably at least 30% less, and most preferably at least 50% less than that of Gold Medal, Pillsbury, or other flour typically found in supermarkets. The cut hot flour is substituted in whole or in part for conventional flour in various recipes, where the conventional flour is produced from wheat or other grains.

The new flour-like ingredient of the invention is produced by providing a specialty grain which will "pop" at an elevated temperature, by heating the specialty grain to an elevated temperature to pop the grain kernels, and by shearing the resulting popped kernels. In contrast, conventional flour typically is produced by grinding at ambient temperatures raw grain which cannot be popped at an elevated temperature or which is not properly processed and prepared to be popped at an elevated temperature.

One important feature discovered during development of the invention is the specialty corn utilized to produce popcorn. Each kernel of the specialty corn includes a hull which is strong and relatively impervious to moisture, and, the starch in each kernel is comprised almost completely of a hard, dense kind of starch. Each kernel includes moisture and oil. When a kernel is heated sufficiently, typically until the temperature in the kernel is greater than 275 degrees F., typically about 350 degrees F. and the pressure in the kernel is greater than 100 psi, typically about 135 psi, the moisture in the kernel turns into a superheated pressurized steam. The starch in the kernel gelatinizes, softens, and becomes pliable. The hull ruptures, producing a sudden drop in pressure inside the kernel to permit a rapid expansion of the steam. The starch and proteins of the endosperm expand into a porous, airy foam. The foam cools quickly, and the protein polymers and the starch set to form the well-known crisply pop corn puff. Although any desired popcorn can be selected, one of the principal cultivated strains of popcorn utilized in the practice of the invention is *Zea mays averta*, a kind of flint corn.

Another important feature discovered during development of the invention is drying of popcorn kernels. Freshly harvested popcorn will "pop", but its high moisture content produces limited expansion and piece of popcorn that are chewy. One reason that rapid expansion and a lower moisture content are particularly desirable in the practice of the invention is that each kernel produces a larger, drier, airier, somewhat harder kernel which is more readily cut during the production of cut hot flour. Freshly harvested popcorn must therefore be dried, typically to a moisture content in the range of 12 to 17% by weight, preferably 13 to 16% by weight, more preferably 14 to 15% by weight. Over drying popcorn is not desirable because the moisture content may be insufficient to cause the popcorn kernels to pop.

A further important feature discovered during development of the invention pertains to reducing popped popcorn kernels into a cut hot flour. The popped kernels must be cut with a rapidly moving keen-edged blade(s), and not ground or mashed. Cutting popped kernels produces porous, elastic particles which in turn collectively produce a light, porous, elastic flour. Such a cut hot flour, when incorporated in a food recipe, reduces the weight of the food and makes the food less dense, and, typically more palatable. The blade(s) used to cut the popped kernels typically has an rpm in the range of 500 to 20,000 rpm, preferably in the range of 500 to 3500 rpm. If, instead of a rotating blade, a laterally oscillating blade is utilized, the blade must at its greatest velocity move at a rate or speed comparable to the midpoint of a rotating blade moving at 500 to 20,000 rpm, preferably 500 to 3500 rpm. Other cutting techniques can, if desired, be utilized; however, it is important that regardless of the technique utilized, pooped kernels should generally be cleanly cut, and not torn apart.

Still another important feature discovered during development of one embodiment of the invention is vacuum packing cut hot flour to complete the process of producing one food product comprising the cut hot flour and its associated packaging. The cut hot flour is light, fluffy, elastic, and entrained with air in and between flour particles. Vacuum packing the cut hot flour significantly reduces the volume occupied by the flour; typically reducing the volume by at least 10%, preferably by at least 20%, and most preferably by at least 30%. Once vacuum packaged cut hot flour reaches its end destination and is opened, the elastic particles expand and draw air into the cut hot flour and the volume occupied by the flour increases by at least 5%, preferably by at least 10%, and most preferably by at least 15%. Vacuum packing provides moisture and oxygen protection for shelf life purposes, as well as consolidating volume to reduce shipping space and costs.

Still a further important feature discovered during development of the invention is the proportion of regular wheat flour which is preferably replaced by cut hot flour in a recipe. Replacing 100% of the regular wheat flour in a recipe is not preferred in the practice of the invention because utilizing 25% to 75% of the original wheat flour called for in a recipe produces a food with desirable taste and texture.

In one embodiment of the invention, cut hot flour is substituted in recipes for all of the conventional wheat flour called for in the recipes.

In another embodiment of the invention, cut hot flour (or a mixture of cut hot flour and another non-wheat flour) is mixed with corn flour and is substituted for 25% to 75% by volume of wheat flour in a recipe.

In another embodiment of the invention, cut hot flour is mixed with one or more other flours (i.e., corn, tapioca, teff, soy, nut, bean or other legume, puffed ground grain, etc.) and is substituted for 25% to 75% by volume of one or more other flours (wheat, oat, nut, bean, tapioca, teff, soy, etc) in a recipe.

Cut hot flour is whole grain flour, which is an advantage to a distributor extolling the "whole grain" virtues of a food.

Recipes utilizing cut hot flour produced in accordance with the invention are provided below by way of illustration and not limitation.

TABLE I

Oatmeal Raisin Cookie Recipes

| INGREDIENT | RECIPE | | | |
|---|---|---|---|---|
| | Control 1 Wheat flour | Control 2 (Gluten Free) (Control 2) | Cut Hot Flour (Modification of Control 1 cookie recipe) | Gluten Free & Cut Hot Flour (Modification of Control 2 cookie recipe) |
| Butter | ⅜ cup | ⅜ cup | ⅜ cup | ⅜ cup |
| Sugar | ⅜ cup | ⅜ cup | ⅜ cup | ⅜ cup |
| Brown sugar | ⅜ cup | ⅜ cup | ⅜ cup | ⅜ cup |
| Eggs | 1 | 1 | 1 | 1 |
| Vanilla | ½ tsp. | ½ tsp. | ½ tsp. | ½ tsp. |
| Cinnamon | ½ tsp. | ½ tsp. | ½ tsp. | ½ tsp. |
| Salt | ¼ tsp. | ¼ tsp. | ¼ tsp. | ¼ tsp. |
| Oats | 1⅜ cups | 1⅜ cups | 1⅜ cups | 1⅜ cups |
| Raisins | ½ cup | ½ cup | ½ cup | ½ cup |
| Baking soda | ½ tsp | ½ tsp | ½ tsp | ½ tsp |
| All purpose wheat flour | ⅝ cup | | ⅜ cup | |
| Commercially available ground popcorn flour | | ⅝ cup | | ⅜ cup |
| Cut hot flour (whole grain) | | None | 1¼ | 1¼ cup |

The ingredients in Table I for the "Control" recipe are combined in conventional fashion to produce a cookie dough. The dough is separated into a total of twenty cookies which are placed on a cookie sheet and baked at 325 degrees F. The ingredients in Table I for the "Gluten Free" recipe are combined in conventional fashion to produce a cookie dough. The dough is separated into a total of twenty cookies which are placed on a cookie sheet and baked at 325 degrees F. Similarly, the ingredients in Table I for the "Cut Hot Flour" recipe are combined in conventional fashion to produce a cookie dough. The dough is separated into a total of twenty cookies which are placed on a cookie sheet and baked at 325 degrees F. Finally, the ingredients in Table I for the "Gluten Free & Cut Hot Flour" recipe are combined in conventional fashion to produce a cookie dough. The dough is separated into a total of twenty cookies which are placed on a cookie sheet and baked at 325 degrees F. The cookies made with the "Cut Hot Flour" and "Gluten Free & Cut Hot Flour" recipes are good tasting, gluten free cookies that are made with whole grains (3 grams per 40 gram cookie and that have lower calories (3.0 fewer calories per cookie) than cookies made with the Control recipe.

TABLE II

Sugar Butter Cookie Recipe

| Ingredient | Control sugar butter cookie | Cut hot flour version |
|---|---|---|
| Sugar | 266.0 gm | 266.09 gm |
| Butter | 150.0 gm | 150.0 gm |
| Eggs | 62.0 gm | 62.0 gm |
| Milk | 160.0 gm | 160.0 gm |
| Vanilla | 1.6 gm | 1.6 gm |
| Baking soda | 2.6 gm | 2.16 gm |
| Baking powder | 4.32 gm | 4.32 gm |
| Salt | 2.2 gm | 2.2 gm |
| Regular Wheat Flour (not whole grain) | 536.0 gm | 0.0 gm |
| Corn flour (whole grain) | 0.0 gm | 134.4 gm |
| Cut hot flour | 0.0 gm | 107.0 gm |

Regular wheat flour has about 3.5 calories per gram of flour. The control cookie includes 2,144 calories from flour. The combination of corn flour and cut hot flour also has about 3.3 calories per gram of flour. The cut hot flour cookies include 956.6 calories from cut hot flour and corn flour. This is in the hot cut flour cookies a 1178.4 calorie reduction from the flour calories in the control cookies.

The ingredients in Table II for the control cookies are combined in conventional fashion to produce a cookie dough and twenty cookies are baked from the dough. The ingredients in Table II for the cut hot flour version of the cookies are combined in conventional fashion to produce a cookie dough and twenty cookies are baked from the dough. The control cookies weigh about 55 grams each. The cut hot flour cookies weigh about 40 grams each. The cut hot flour cookies have a comparable volume in comparison to the control cookies. However, the cut hot flour cookies have about 60 less calories per cookie than the control cookies.

Cookies and other food made with whole grain flour have disadvantages. Namely, food products made with whole grain flour (including micromilled white whole wheat flour):

1. Often are judged to not taste as good as food products made with non-whole grain flours.

2. Have a gritty texture in the mouth. Even micromilled white whole wheat flour still has some of these attributes.

3. Have a darker appearance.

4. Include oils in the wheat bran which can cause rancidity issues with respect to shelf life.

When cut hot flour is substituted in whole or in part for whole grain flour, these issues are solved or minimized. And, cut hot flour is made with 100% whole grain.

Another advantage of cut hot flour is that it occupies in a cookie or other food product a larger volume per unit weight than does regular or whole grain wheat flour. This permits the amount of flour required to be reduced (typically by 25% to 75% by weight) and reduces the caloric content of the cookie or other baked product. By way of example, a 40 gram cut hot flour cookie may contains 12 grams by weight of whole grains, but have about 50 less calories than a control version cookie made with all purpose regular wheat flour. Although the amount of cut hot flour substituted In a recipe In place of conventional wheat flour or another flour is preferably in the range of 10% to 75% by weight, an amount less than 25% or greater than 75% can be utilized.

Still another advantage of cut hot flour is that it is gluten free. When cut hot flour is combined with corn flour, brown rice flour, or another gluten free flour then it can be claimed that a cookie or other food product is gluten free. In addition, if the corn flour and other flours are whole grain flours, the claim "made with 100% whole grain" can be made.

A further advantage of cut hot flour is that food product produced with cut hot flour typically taste good and are, with respect to taste, comparable to the taste quality of a food product made with non whole grain wheat flour.

For products not required to be gluten free, the corn flour/cut hot flour blend can be blended with any and all other flours with similar advantages.

The best flours to blend with cut hot flour currently seems to be corn flour or white rice flour for gluten containing products (i.e., products which also contain wheat flour) and white rice flour for gluten free products. Corn flour, if not degerminated, is considered whole grain flour, is gluten free, and has a more favorable flavor texture than its counterparts such as whole wheat, oat, barley, etc. flours. More importantly, if a 100% whole grain and gluten free product is desired, corn flour is far superior to using brown rice flour from a flavor, texture, appearance and cost standpoint. When white rice flour is utilized, a claim that the product is 100% whole grain cannot, of course, be made; however, a "Good Source" claim might still be made if the product contain 10% by weight whole grain Corn flour is about $0.15/lb., brown rice flour is about $0.40/lb. As noted, white rice flour typically costs about $0.40 to $0.35/lb.

Hot cut flour produced from popcorn seems to be uniquely suited in the practice of the invention. On the other hand, as would be appreciated by those of skill in the art, grains other than popcorn (i.e., rice, wheat, oats, etc.) may be susceptible to being puffed and sheared or cut to produce flour. Similarly, fruits, vegetables, potatoes. nuts, etc. may also be susceptible to being puffed and sheared and used in a manner similar to that of the puffed popcorn flour. The densities of such other flours would probably in most cases be higher than that of hot cut flour produced by appropriately drying and heating popcorn to pop popcorn kernels and by cutting the resulting popped kernels.

The following bread recipes are provided by way of example, and not limitation.

TABLE III

Bread Recipes

| Ingredient | Bread Recipe Regular Whole Grain White | Bread Recipe Gluten Free Whole Grain |
|---|---|---|
| White rice flour | — | 75.0 gms |
| All purpose flour | 75.0 gms | — |
| Cut hot flour | 21.0 gms | 21.0 gms |
| Baking powder | 3.0 gms | 3.0 gms |
| Salt | 1.5 gms | 1.5 gms |
| Sugar | 7.0 gms | 5.0 gms |
| Egg whites | 52.0 gms | 52.0 gms |
| Skim milk | 105.0 gms | 115.0 gms |
| Butter | 3.0 gms | 3.0 gms |
| Xanthan Gum | 2.0 gms | 2.0 gms |

The eggs, milk and sugar are combined in a Hobart mixer to produce a preliminary mixture. The whip attachment for the mixer is utilized, and the mixer is operated at the "high" speed for about 2 minutes. All of the dry ingredients, except the cut hot flour, are added to the preliminary mixture to produce a secondary mixture. The secondary mixture is mixed for two minutes by the Hobar mixer using a paddle attachment. The hot cut flour is then admixed into the secondary mixture to produce a tertiary mixture. The tertiary mixture is placed in a bread pan and bakes for 30 to 60 minutes in an oven heated to 350 to 375 degrees F. In an alternate embodiment of the invention, the ingredients are combined and mixed in a single step.

As is appreciated by those of skill In the art, the cookie and bread recipes set forth herein can utilize a variety of ingredient in varying amount, including, without limitation oils for butter, alternate gums/starches for xanthan gum, whole eggs and water/dry milk combinations for skim milk.

Having described my invention in such terms as to enable those skilled in the art to practice the invention, we claim:

1. A method for producing a food product, flour comprising the steps of
   (a) providing a plurality of flint corn kernels;
   (b) drying the flint corn kernels to a moisture content in the range of 12% to 16% by weight;
   (c) popping said flint corn kernels by heating said kernels to
      (i) produce in said kernels a temperature greater than 275 degrees F. and a pressure greater than 100 psi,
      (ii) gelatinize and soften the starch in the kernel,
      (iii) rupture the hulls of said flint corn kernels to produce a sudden drop in pressure inside the kernel to permit a rapid expansion of the steam to expand the starch and proteins of the endosperm into porous, airy, elastic foam particles;
   (d) cooling said porous, airy, elastic foam particles;
   (e) cutting with a moving blade said porous, airy foam particles into pieces having a width greater than 0.005 inches to produce an elastic, air entrained popcorn flour occupying a volume;
   (f) vacuum packaging said elastic popcorn flour to reduce the volume occupied by said popcorn flour.

2. The method of claim 1 wherein
   (a) said vacuum package of said popcorn flour is transported to a selected location;
   (b) said vacuum package is opened at said selected location to permit said popcorn flour to expand elastically; and,
   (c) at least a portion of said popcorn flour is substituted for wheat flour in a recipe to make a food product.

3. The method of claim 1 wherein said vacuum packing reduces the volume occupied by said popcorn flour by at least 10%.

4. The method of claim 1 wherein said vacuum packing reduces the volume occupied by said popcorn flour by at said vacuum packing reduces the volume occupied by said popcorn flour by at least 20%.

5. The method of claim 1 wherein said vacuum packing reduces the volume occupied by said popcorn flour by at least 30%.

6. The method of claim 1 wherein said air entrained popcorn flour has a density at least 10% less than conventional wheat flour found in supermarkets.

7. The method of claim 1 wherein said air entrained popcorn flour has a density at least 20% less than conventional wheat flour.

8. The method of claim 1 wherein said air entrained popcorn flour has a density at least 30% less than conventional wheat flour.

9. The method of claim 1 wherein said air entrained popcorn flour has a density at least 50% less than conventional wheat flour.

10. The method of claim 1 wherein
(a) said vacuum packing reduces the volume occupied by said popcorn flour by at least 10%; and,
(a) said air entrained popcorn flour has a density at least 10% less than conventional wheat flour.

11. The method of claim 1 wherein
(a) said vacuum packing reduces the volume occupied by said popcorn flour by at least 20%; and,
(a) said air entrained popcorn flour has a density at least 20% less than conventional wheat flour.

12. The method of claim 1 wherein
(a) said vacuum packing reduces the volume occupied by said popcorn flour by at least 30%; and,
(a) said air entrained popcorn flour has a density at least 30% less than conventional wheat flour.

13. The method of claim 1 wherein
(a) said vacuum packing reduces the volume occupied by said popcorn flour by at least 30%; and,
(a) said air entrained popcorn flour has a density at least 50% less than conventional wheat flour.

14. The method of claim 1 wherein opening said vacuum packed flour causes the volume of said flour to increase by at least 5%.

15. The method of claim 1 wherein opening said vacuum packed flour causes the volume of said flour to increase by at least 10%.

16. The method of claim 1 wherein opening said vacuum packed flour causes the volume of said flour to increase by at least 15%.

17. The method of claim 1 wherein
(a) said vacuum packing reduces the volume occupied by said popcorn flour by at least 10%; and,
(b) opening said vacuum packed flour causes the volume of said flour to increase by at least 5%.

18. The method of claim 17 wherein said air entrained popcorn flour has a density at least 20% less than conventional wheat flour.

19. The method of claim 1 wherein
(a) said vacuum packing reduces the volume occupied by said popcorn flour by at least 20%; and,
(b) opening said vacuum packed flour causes the volume of said flour to increase by at least 10%.

20. The method of claim 17 wherein said air entrained popcorn flour has a density at least 30% less than conventional wheat flour.

* * * * *